July 2, 1940. W. E. HALE 2,206,840
MEANS FOR ATTACHING CABLE FOR REVERSING DRAG SCRAPERS
Filed Aug. 9, 1939

WITNESS:

INVENTOR
William E. Hale
BY
Augustus B Stoughton
ATTORNEY.

Patented July 2, 1940

2,206,840

UNITED STATES PATENT OFFICE 2,206,840

MEANS FOR ATTACHING CABLE FOR REVERSING DRAG SCRAPERS

William E. Hale, Fort Washington, Pa., assignor to Beaumont Birch Company, Philadelphia, Pa., a corporation of Pennsylvania Application August 9, 1939, Serial No. 289,094

3 Claims. (Cl. 37—147)

The object of my invention is to provide means for attaching a cable for reversing double edge drag scrapers, which attachment permits the scraper to be turned over or reversed in the direction of travel by the pull of the cable. Heretofore when it was desired to reverse the direction of travel of a drag scraper it was necessary to send out a crew of men to reverse the connections of the drag scraper cable and to turn the scraper itself around. By means of my arrangement, some of the connections between the attachment and the scraper are easily disconnected, the scraper is then turned over by the pull of the cable itself, after which the connections between the attachment and the scraper can be readily and quickly remade so that the scraper can be quickly and easily operated in the opposite direction.

For an illustration of some of the many forms my apparatus or mechanism may take reference is to be had to the accompanying drawing, in which.

Figures 1, 2, 3, 4, 5:
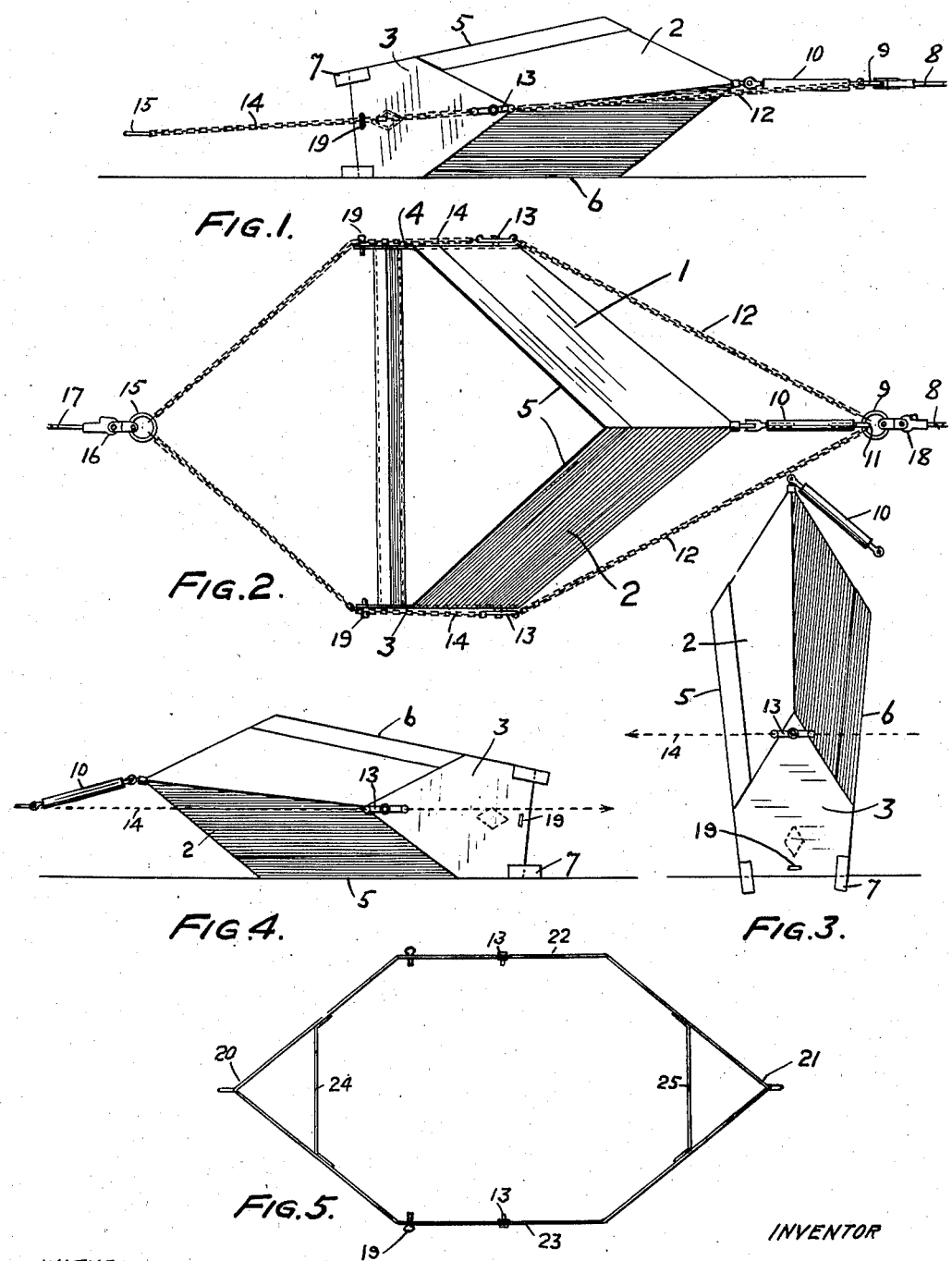
Figure 1 is a side elevation of my device.
Figure 2 is a plan view of my device.
Figure 3 is a diagrammatic view in side elevation showing one position during the reversing movement.
Figure 4 is a diagrammatic view in side elevation showing the scraper in reverse position.
Figure 5 is a diagrammatic view in plan showing a modified form of attachment.

My device is shown as consisting of a double edged scraper having two operating positions and provided with diverging arms generally indicated at 1 and 2, which arms have at their outer ends flat side plates generally indicated at 3 and 4.

As will be readily seen arms 1 and 2 terminate in digging edges 5 and 6, which are located in planes converging toward each other at the front of the scraper. Side plates 3 and 4 carry teeth 7.

The scraper and the material to be conveyed thereby are moved by a cable 8 connected to a swivel shackle and open wedge socket 18 which in turn is connected to a chain ring 9, to which is also connected a turnbuckle 10 which has a readily detachable connection by a fastening means 11 with chain ring 9. Also connected to chain ring 9 are reaches of chain 12 which at their opposite end connect to pivots 13 carried by side plates 3 and 4. At their opposite sides pivots 13 are connected to reaches of chain 14, which at their front end connect with a second chain ring 15. Chain ring 15 carries a swivel shackle and open wedge socket 16, to which is attached a cable 17. Side plates 3 and 4 also carry clamps 19 which are shown in Figs. 1 and 2 as attached to reaches of the chain 14.

The operation of my device is as follows: Referring to Figs. 1 and 2 when it is desired to reverse the direction of the scraper the fastening means 11 for the turnbuckle 10 is disconnected, and the clamps 19 are detached from the reaches of chain 14. Power is then applied to the cable 17 and the scraper pivots about the lower digging teeth 7, the turnbuckle swinging loosely from the rear of the scraper. The pull is continued on cable 17 until the scraper falls over into the reversed position to that shown in Figs. 1 and 2, which reversed position is shown in Fig. 4. The fastening means 11 is then fastened to ring 15 and the clamps 19 are fastened to the reaches of the chain, after which the scraper is firmly held in position to operate in the opposite direction.

In Fig. 5 is shown a modification of my device in which a cradle or rigid member is used in place of the reaches of chains 12 and 14. This cradle is shown as having pointed ends 20 and 21 and flat sides 22 and 23 which sides are arranged to support or receive pivots 13. Ends 20 and 21 are braced as indicated at 24 and 25. In place of chains 12 and 14, jointed rods, flat irons or other like members could be used.

While the invention has been described with respect to certain particular preferred examples which give satisfactory results, it will be understood by those skilled in the art after understanding the invention, that various changes and modifications may be made without departing from the spirit and scope of the invention and it is intended, therefore, in the appended claims to cover all such changes and modifications.

What is claimed as now and desired to be secured by Letters Patent is

1. The arrangement for reversing a double edged scraper comprising a double edged scraper, a cable, diverging chains connected to said cable, pivots connected to said chains and to said scraper, second diverging chains connected to said pivots, a second cable connected to the convergent ends of said second diverging chains, and clamps on the sides of said scraper adapted for connection to either of said pairs of diverging chains.

2. The arrangement for reversing a double edged scraper comprising a double edged scraper, a cable, diverging chains connected to said cable, pivots connected to said chains and to said scraper, second diverging chains connected to said pivots, a second cable connected to the convergent ends of said second diverging chains, a turnbuckle connected to the rear of said scraper, means for connecting said turnbuckle to either of said cables, and clamps on the sides of said scraper adapted for connection to either of said pairs of diverging chains.

3. The arrangement for reversing a double edged scraper comprising a double edged scraper having two operating positions, an enclosure surrounding said scraper, pivots connecting said scraper to said enclosure, cables connected to both ends of said enclosure, removable connections between said enclosure and said scraper adapted to connect said scraper to said enclosure at either of its two operating positions.

WILLIAM E. HALE.